US005999393A

United States Patent [19]

Brower

[11] Patent Number: 5,999,393

[45] Date of Patent: Dec. 7, 1999

[54] SURGE PROTECTOR AND LEAD ASSEMBLY WITH IMPROVED CONTACT AREA BETWEEN THE PROTECTOR AND LEAD

[75] Inventor: Boyd G. Brower, Keller, Tex.

[73] Assignee: Siecor Corporation, Hickory, N.C.

[21] Appl. No.: 08/881,486

[22] Filed: Jun. 24, 1997

[51] Int. Cl.$^{6}$ .......... H02H 1/00

[52] U.S. Cl. .......... 361/117; 361/56; 361/111; 361/119; 361/120

[58] Field of Search .......... 361/56, 91, 111, 361/117, 119, 120, 129, 124

[56] References Cited

U.S. PATENT DOCUMENTS 4,191,987 3/1980 Coren .......... 361/124
5,307,231 4/1994 Smith .......... 361/117
5,388,023 2/1995 Boy et al. .......... 361/129

*Primary Examiner*—Stephen W. Jackson

[57] ABSTRACT

The present invention provides a lead for attachment to a cylindrical protector element with a circular contact ring thereon and a circular groove adjacent and axially inward of the contact ring. The lead is a conductive member with a first end and a second end opposite thereto. The second end has an arcuate surface with a ridge protruding therefrom than is sized to engage the groove of the protector element and guide the element until a portion of the contact ring of the element is disposed against the arcuate portion of the second end of the lead.

23 Claims, 3 Drawing Sheets

SURGE PROTECTOR AND LEAD ASSEMBLY WITH IMPROVED CONTACT AREA BETWEEN THE PROTECTOR AND LEAD

TECHNICAL FIELD OF THE INVENTION

The present invention relates to a surge protector and lead assembly for use in protecting telecommunications lines and equipment. In one aspect, the present invention relates to a protector and lead assembly with an improved joint between the lead and protector contact to withstand higher surges.

BACKGROUND OF THE INVENTION

Current attachment of leads to contact rings on gas tube protector elements of the type shown in U.S. Pat. No. 5,388,023 were developed when the standard surge test that the contact was required to withstand was 8×20 at 10,000 amps per side one time. Recently, a requirement in the telecommunications industry have required that the attachment point between the lead and the contact ring of the gas tube withstand an 8×20 surge test at 20,000 amps per side up to 20 times. It has been found that convential attachment points between gas tube protector elements and leads sometimes fail this more rigorous standard. Therefore, a need exists for an improved attachment between the lead and the gas tube ring contact to withstand the more rigorous standard. Additionally, the attachment of leads to gas tube ring contacts is often cumbersome and difficult to automate. Therefore a need exists for an improved attachment that allows easier and reliable automation.

SUMMARY OF THE INVENTION

The present invention provides a lead and a protector and lead assembly which provides for an increased surface area of contact between the lead and the protector element to withstand the higher surge testing requirements while at the same time lending itself to ease and repeatability of manufacture.

One aspect of the present invention is a protector element and lead assembly comprising a protector element having a generally cylindrical outer surface and a first end and a second end opposite thereto. The element has at least a first circumferential contact ring at the first end of the element. The contact ring has a circumferential surface facing radially outward. The outer surface of the element defines a circumferential groove adjacent and axially inward of the contact so that a contact shoulder is defined on the contact ring that faces axially inward. The assembly also comprises a lead having a first end and a second end opposite thereto with the second end defining a generally unshaped surface with an arcuate portion that is stepped. The stepped arcuate portion defines a first surface that is the radially inwardmost surface and a second surface stepped radially outward from the first surface so as to define a shoulder surface that faces in the axial direction toward the first end of the lead. The second end is disposed over the protector element such that the arcuate portion of the first surface is generally disposed in the groove and the arcuate portion of the second surface is disposed generally against the circumferential surface of the contact.

Another aspect of the invention is a lead for attachment to a protector element with at least one circular contact ring and a circular groove adjacent and axially inward of the contact ring. The lead comprises a conductive member having a first end and a second end opposite thereto with the second end having an arcuate surface with a ridge extending radially inward from the arcuate surface and dimensioned to slide into the groove of the protector element as the arcuate surface is disposed against the contact ring of the protector element.

With the lead and the protector and lead assembly of the present invention, there is an increased surface area of contact with the contact ring. This surface area can be further increased with solder to fill gaps and voids at the interfaces.

Another aspect of the invention is a method for creating a lead with increased surface area for contact with a protector element and repository for solder. The method comprises forming an asymmetrical cut-out in a plate member and folding the plate member over on itself about a bend axis through the cut-out such that one portion of the plate member overhangs the other by virtue of the asymmetry of the cut-out. The overhang slides into the groove of the protector element and the other arcuate surface is for being disposed against the contact ring of the protector element. The fold is performed to leave a gap between the two portions that can wick solder therein.

DETAILED DESCRIPTION OF THE PREFERRED EMBODIMENT

Figure 1:
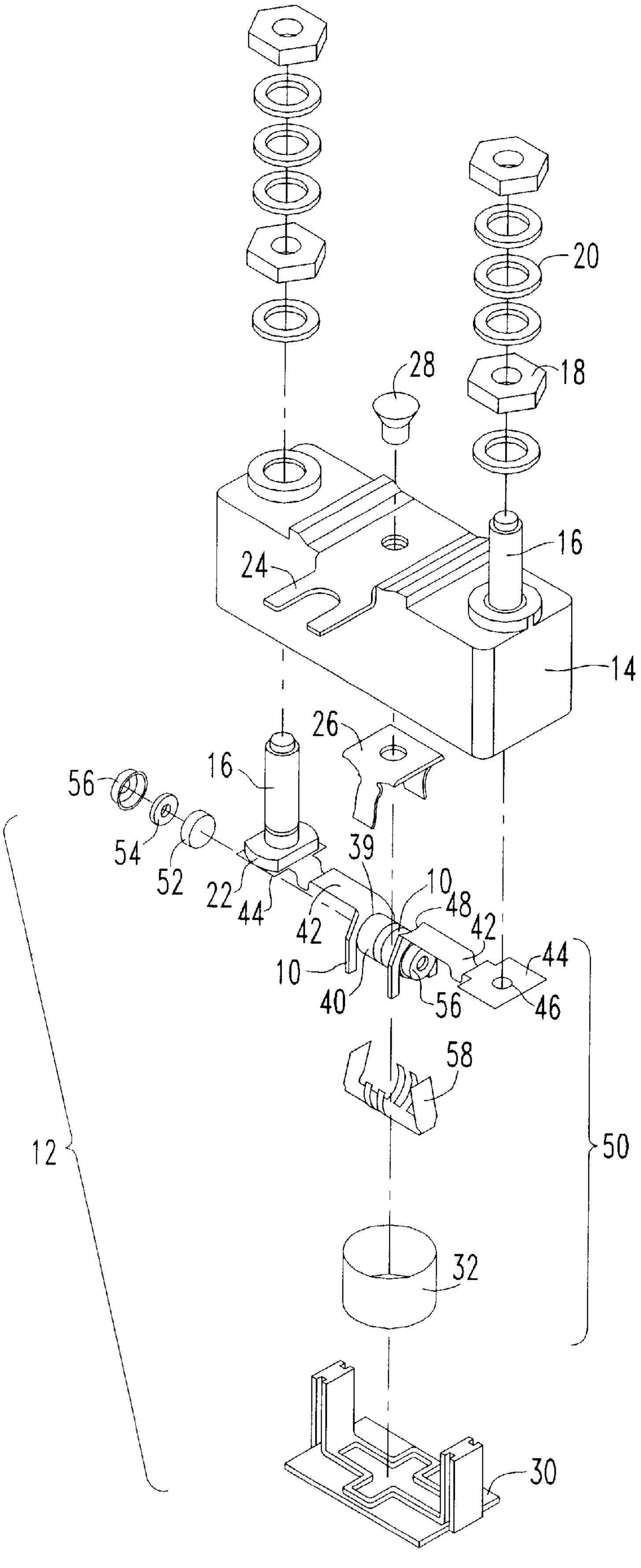
FIG. 1 is an exploded perspective view of a protector module incorporating the preferred embodiment of the protector and lead assembly of the present invention.

With reference to FIG. 1 one application for use of the protector and lead assembly 10 of the present invention is shown as protector module 12. Module 12 is commonly referred to as a station protection module and is used in network interface devices (NIDs) on the side of a telephone subscribers residence to protect the telephone lines and equipment at the subscriber from being damaged by surges caused, for example, by lightening or power crosses. It should be understood that assembly 10 can be adapted for use in other applications and packaging, for example, being incorporated in a PTD® module as disclosed in U.S. Pat. No. 5,333,193 and others.

The components and arrangement of module 12 apart from assembly 10 is known in the art and generally has housing 14 through which extend studs 16 which have nuts 18 and washers 20 which is know in the art for attaching telephone lines. Studs 16 have bases 22 which are electrically connected to each other through protector and lead assembly 10. Assembly 10 is also in contact with ground bracket 24 through mount 26 and rivet 28 and assembly is intended to conduct any surges to ground bracket 24 which is to be connected to earth ground on installation of the NID. Module 12 is closed by cover 30. Flexible band 32 can be placed around assembly 10 for added support against shocks and from handling during assembly.

Figure 2:
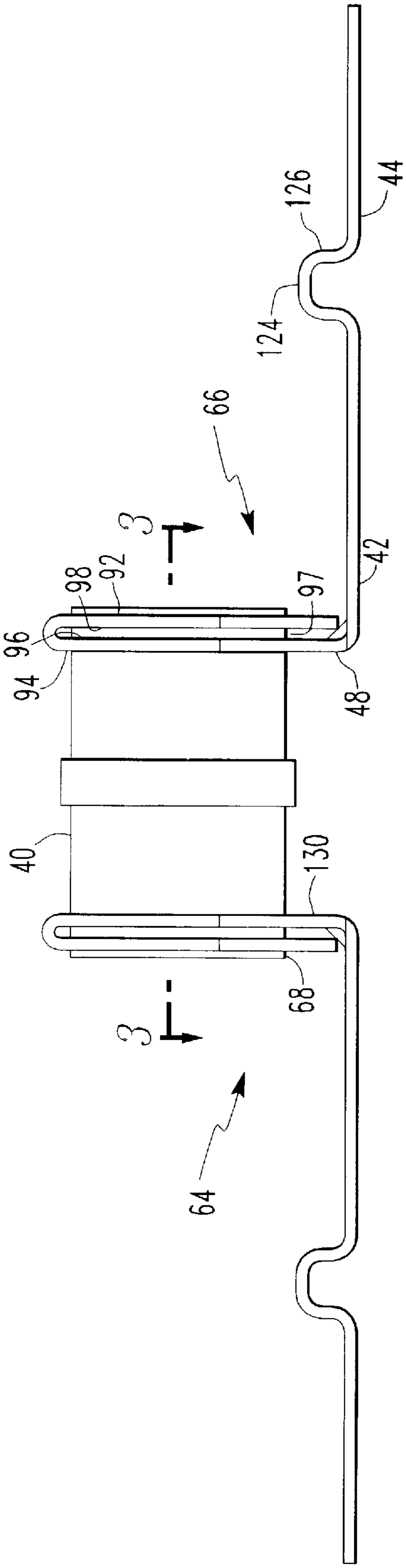
FIG. 2 is a side view of the preferred embodiment of the protector and lead assembly of the present invention.
Figure 3:
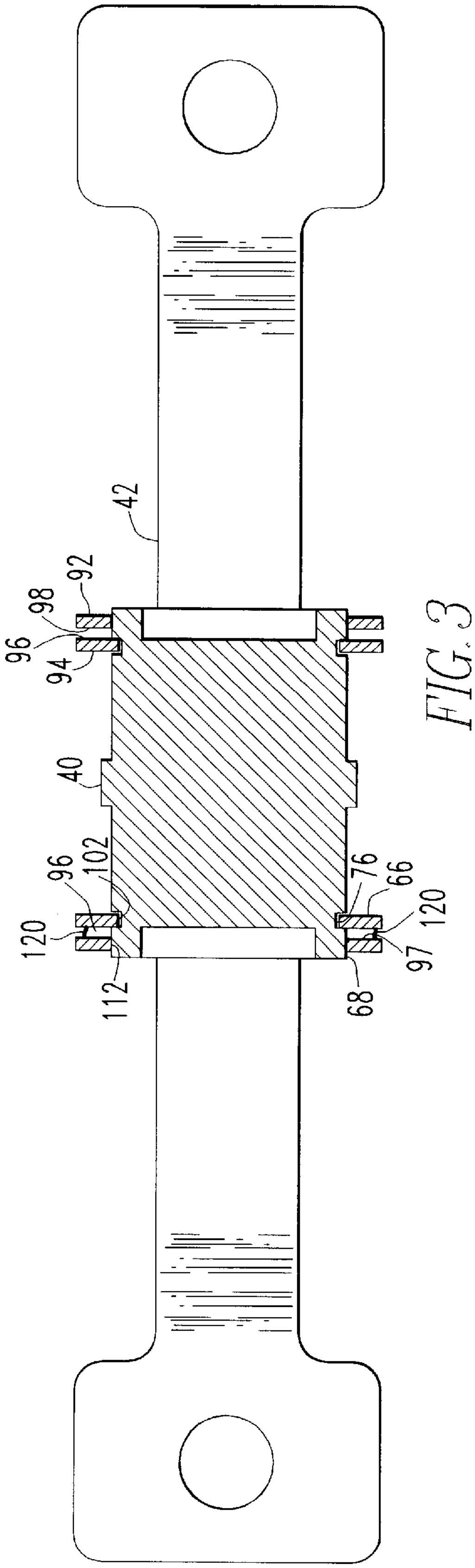
FIG. 3 is a cross-section along line 3—3 of FIG. 2.

With further reference to FIGS. 2 and 3, assembly 10 comprises protector element 40 and two leads 42 which are identical in the preferred embodiment. Each lead 42 has first end 44 which has hole 46 for facilitating riveting/soldering of one of the studs 16 used in this application thereto. Leads 42 have second end 48 opposite first end 44 that is attached to protector element 40.

With reference to FIG. 1, protector element 40 in the preferred embodiment is incorporated into protector arrangement 50. Element 40 and arrangement 50 are known and disclosed in U.S. Pat. No. 5,388,023. The '023 patent is incorporated herein in its entirety. The MOV 52 and element 40 are available commercially from Siemens as part numbers Z40-230 and T44-C350, respectively. This particular arrangement 50 has protector element 40 as a gas tube in the preferred embodiment, however, the present invention may use other elements, for example, solid state, as long as they have a sufficiently similar exterior configuration to element 40 as will be discussed further herein. Arrangement 50 also has two varistors 52, fusible elements 54 and end caps 56 all maintained in place by clip 58; however, all these elements are optional with respect to the present invention and do not form part of the protector and lead assembly 10. The '023 patent explains the arrangement of these elements and U.S. Patent application Ser. No. 08/88/422, entitled "Gas Tube Surge Protector with Interacting Varistors" filed concurrently herewith and assigned to the assignee of the present invention, explains the desired values of the various protective elements in relation to each other.

Figure 4:
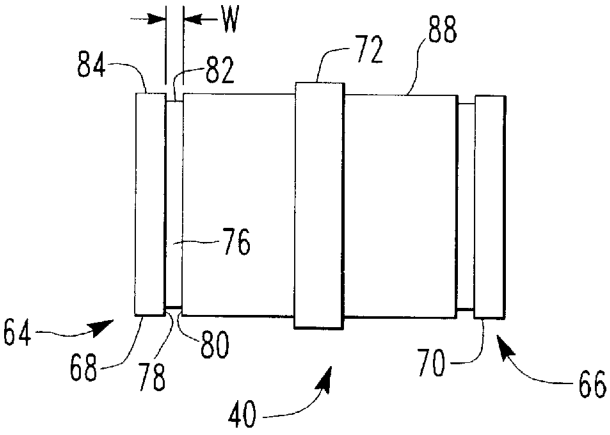
FIG. 4 is a side view of a protector element for use in the preferred embodiment of the protector and lead assembly of the present invention.

With reference to FIG. 4 protector element 40 is shown. Element 40 is generally cylindrically shaped with first end 64 and second end 66 opposite thereto. Element 40 has first contact ring 68 at first end 64 and second contact ring 70 at second end 66. Additionally, ground ring 72 located at a midpoint along element 40. Because element 40 is symmetrical about a vertical axis transverse the cylindrical axis, description of one end of element 40 will suffice as a description of both ends. Element 40 defines circumferential groove 76 adjacent and axially inward from contact ring 68 so as to define ring shoulder surface 78 that faces axially inward and element shoulder surface 80 opposite thereto that faces axially outward. The width W of groove 76 is generally defined as the distance between ring shoulder surface 78 and element shoulder surface 80. Groove has bottom surface 82 between the opposing shoulder surfaces 78, 80 that faces generally radially outward. Contact ring 68 has outer surface 84 which faces generally radially outward. It should be understood that the transition between these various surface may be radiused. Outer surface 84 and ring shoulder surface 78 are surfaces of contact ring 68. Bottom surface 82 of groove 76 generally is the outer surface of a copper electrode that is mechanically and electrically joined to contact ring 68. Element 40 has mid portions 88 that are typically ceramic and the copper electrodes are typically joined to mid portions 88 by a braising material. As is known about gas tube protector elements, they contain a gas under pressure and it is important that the hermetic integrity of element 40 not be compromised or else the gas may vent from element 40.

Figure 5:
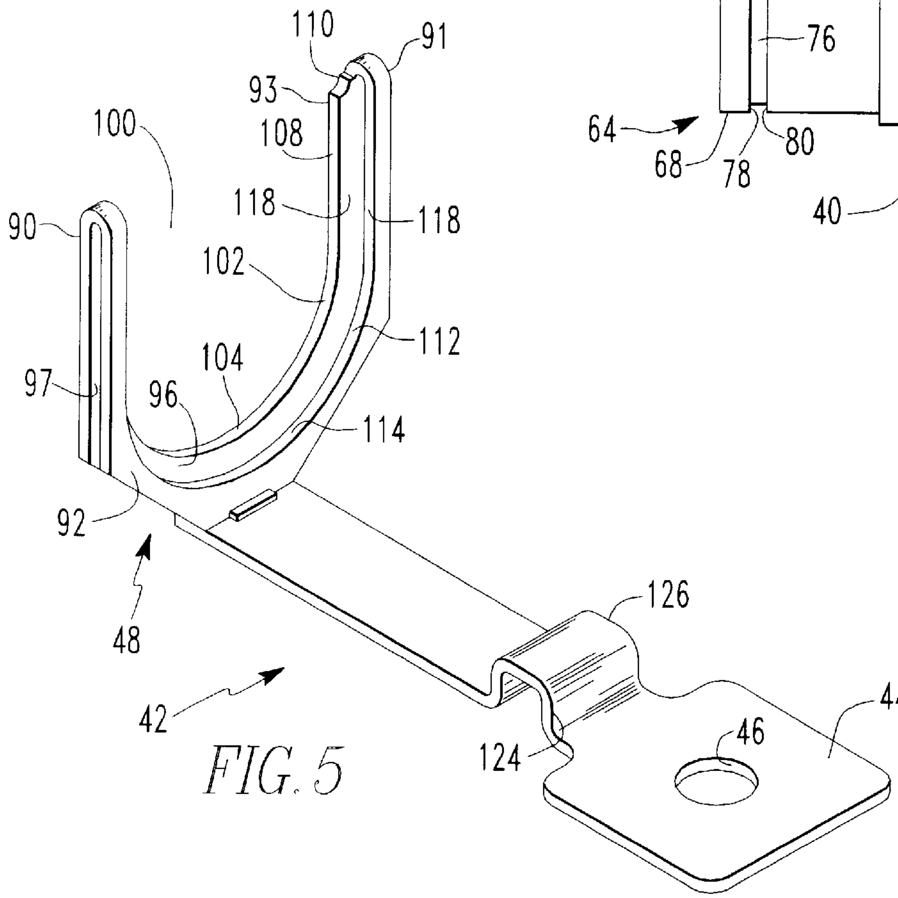
FIG. 5 is a perspective view of the preferred embodiment of the lead of the present invention.
Figure 6:
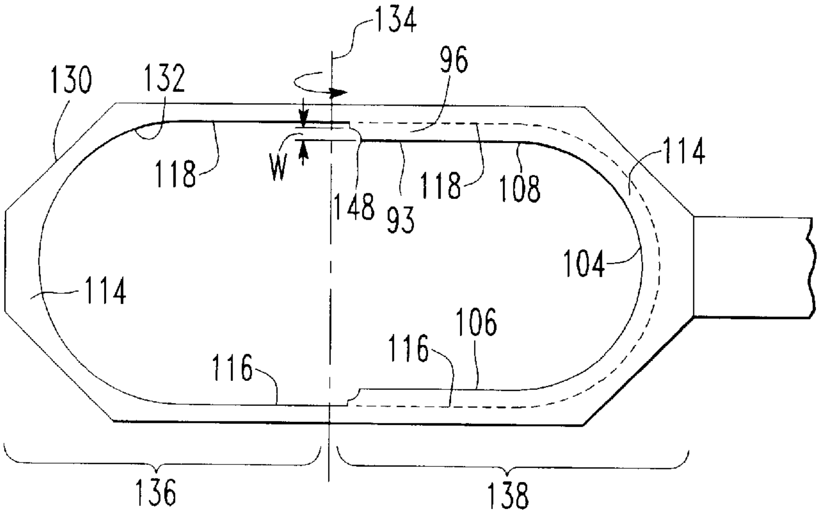
FIG. 6 is a top view of the preferred embodiment of the second end of the lead of the present invention prior to the folding of the second end over on itself.

Contact rings 68, 70 are the points of element 40 that are connected in a telecommunications circuit and thus leads are needed to extend to the wire connection points, for example, studs 16 shown in FIG. 1. FIGS. 5 and 6 show the preferred embodiment of lead 42. First end 44 may be of any configuration suitable to connect into a telecommunications circuit. In the embodiment shown, first end 44 is generally flat with hole 46 that facilitates riveting/soldering of stud 16 thereto. Lead 42 is preferably tin plated cartridge brass.

Second end 48 of lead 42 is generally U-shaped and sized to fit over an end of element 40. Again, because the two leads 42 are identical and element 40 is symmetrical, description of one lead 42 and its engagement with first end 64 and first contact ring 68 will suffice as description of the engagement of the other lead with second end 66 and second contact ring 70. However, it should be understood that it is not required that two of the leads 42 be used. An application may exist where there is only need for one lead 42 and some other type of lead may be used on the other contact ring.

With reference to FIGS. 5 and 6, the U-shape of second end is achieved by a doubling over second end 48 on itself to create two arms 90, 91 that are shaped to slidably engage one of the grooves 76 and contact rings 68, 70 of element 40. Ridge 93 extends along arm 90, through an arcuate portion 95 of second end 48 and along arm 91 and is dimensioned to slide into groove 76. Second end 48 with arms 90, 91 has first surface 92 facing away from element 40, second surface 94 opposite thereto facing toward element 40, and opposed surfaces 96, 98 created by the bend and between first surface 92 and second surface 94. Gap 97 is defined between opposed surface 96, 98.

Second end 48 defines slot 100 between arms 90, 91 which preferably has a generally u-shape configuration and has first u-shaped surface 102 facing radially inward and second u-shaped surface 112 facing radially inward. Surfaces 102 and 112 are radially stepped from each other such that first surface 102 is radially inward of second surface 112. Surface 102 has arcuate portion 104, first straight portion 106 and second straight portion 108 generally parallel with and facing first straight portion 106. Straight portions 106, 108 terminate at step 110. Surface 112 similarly has arcuate portion 114, first straight portion 116 and second straight portion 118 generally parallel with and facing straight portion 116. First u-shaped surface 102 and second u-shaped surface 112 are separated by gap 97.

In the preferred method of doubling over, with reference to FIG. 6, second end 48 is generally a plate member 130 with an asymmetrical cut-out 132 therethrough that is asymmetrical about bend axis 134. Plate member 130 is doubled over about bend axis 134 such that first portion 136 overlays second portion 138. The portion of cut-out 132 that resides in first portion 136 is generally u-shaped with an arcuate portion 114 and straight portions 116, 118 while the portion of cut-out 132 that resides in second portion 138 is similarly u-shaped with arcuate portion 104 and straight portions 106, 108, yet the radius of arcuate portion 104 is less than arcuate portion 114 so that overhang 148 is created with width W. With this preferred method, overhang 148 defines ridge 93. Width W of overhang 148 is preferably not more than the height of ring shoulder surface 78 so that when overhang 148 is received in groove 76, it will not bottom out in bottom surface before arcuate portion 104 contacts outer surface 84 of a contact ring 68, 70.

Twice the radius of arcuate portion 104 is generally equal to the distance between straight portions 106 and 108 which is slightly larger than the diameter of element 40 at bottom surface 82 of groove 76 so that groove 76 slides into first u-shaped surface 102 so that arcuate portion 104 is generally disposed against about 180 degrees of bottom surface 82 of groove 76. Twice the radius of arcuate portion 114 is generally equal to the distance between straight portions 116 and 118 which is slightly larger than the diameter of outer surface 84 of first contact ring 68 so that contact ring 68 slides into second u-shaped surface 112 so that arcuate portion 114 is generally disposed against about 180 degrees of outer surface 84 of contact ring 68.

Additionally, when second end 48 is slid over an end of element 40, opposing surface 96 is generally disposed against ring shoulder surface 78 while gap 97 is disposed around the edge of the contact ring at the ring shoulder surface. It is preferred that element 40 is "bottomed out" in slot 100 such that there is generally 180 degrees of contact between the stepped surfaces 102, 112 and bottom surface 82 and outer surface 84, respectively. Once in this position, then solder can be applied on the inside of each arm and gap 97 acts to wick the solder in between opposing surfaces 96, 98 and against more of outer surface 84 of contact ring 68. The preferred gap is about 0.016 inch wide and the preferred type of solder is a eutectic tin-lead. Once the solder is applied, the effect is to have 180 degrees of stepped surface contact between lead 42 and contact ring 68 and groove 76 of element 40 as detailed schematically in FIG. 6.

Because of the ductile nature of second end 48, arms 90, 91 can give to receive and conform to an end of element 40 during insertion. Invariably there are gaps and voids between the stepped surfaces of second end 48 and the groove and contact ring. There is the chance that arcing will occur across any gaps and cause carbon build up which adversely affects the lead/element joint. The wicking action of the solder into gap 97 generally fills such gaps and voids to provide a substantially continuous contact and prevent arcing.

It is preferred that the width of ridge 93 is slightly less than the width W of groove 76 so that ridge 93 will not act to wedge contact rings 68, 70 out of attachment with element 40 thereby creating a risk of venting of the gas tube. Once step 110 at the ends of ridge 93 locates in groove 76, element 40 locates itself in slot 100 during insertion of element 40 into slot 100. With ridge 93 disposed in groove 76, axial movement of second end 48 axially beyond the end of element 40 is prevented. This is desired in this embodiment because if second end 48 extended axially beyond the end of element 40 it could contact or interfere with the other components of protector arrangement 50 such as contact an end cap 56.

In the application shown in FIG. 1, the leads 42 are attached between the two studs 16. Because the two studs 16 are fixed relative to each other and because second ends 66 of leads 42 cannot move axially outward as they are limited by contact rings 68, 70, there is a concern that movement of studs 16, a tolerance stack up during assembly or thermal contractions and expansions could cause the second ends 66 to bear axially outward against contact rings 68, 70 thereby creating a risk of separation of the contact rings 68, 70 from element 40 and possible venting of the gas tube. To eliminate this concern, leads 42 have been provided with strain relief 124 shown by example as buckles 126 that can relieve any stress caused by, for example, expansion, contraction or torsion of lead 42, so that second end 48 will not bear axially outward against a contact ring 68, 70.

It has been found that buckles 126 provide the additional advantage of interrupting any potential migration path for water toward protector element 40. Also, as can be seen in FIG. 1, buckles 126 extend away from the underside of the top of housing 14 providing an area under which potting material can flow and be positively retained inside housing 14 by virtue of buckles being part of leads 42 which are fixed relative to housing 14 due to studs 16 and mount 26. Without such buckles, it was possible that the potting compound would break loose from within housing 14 during drop tests.

Although the present invention has been described with respect to a preferred embodiment, it should be understood that various changes, substitutions and modifications may be suggested to one skilled in the art and its is intended that the present invention encompass such changes, substitutions and modifications as fall within the scope of the appended claims.

I claim:

1. A protector element and lead assembly comprising:

a protector element having a generally cylindrical outer surface comprising:

a first end and a second end opposite the first end;

at least one circumferential contact ring at the first end of the protector element, the contact ring having a circumferential surface facing radially outward; and a circumferential groove adjacent and axially inward of the contact ring, the contact ring and groove defining a contact shoulder therebetween; and a lead having a first end and a second end opposite the first end, the second end having a first and a second arcuate surface, the first arcuate surface electrically connected to the protective element in the circumferential groove and the second arcuate surface electrically connected to the circumferential surface of the contact ring, wherein the second end of the lead has an elongated opening, the first arcuate surface located on an inside portion of a first side of the elongated opening and the second arcuate surface located on an inside portion of a second side of the elongated opening, the second end being folded back on itself about a bend axis to create a U-shaped opening, the protector element being disposed in the U-shaped opening.

2. The assembly of claim 1 wherein the elongated opening is asymmetrical, the opening being larger on the second side than the first side.

3. The assembly of claim 1 wherein the first side of the elongated opening is stepped inward relative to the second side.

4. The assembly of claim 1 wherein folded portions are created in the second end when folded back on itself and there is a gap between those folded portions.

5. The assembly of claim 1 wherein each arcuate surface of the lead contacts about 180° of the outer surface of the protector element.

6. The assembly of claim 1 wherein the first arcuate surface is in electrical and physical contact with the contact shoulder.

7. A lead to attach to a protector element, the protector element having at least one circular contact ring and a groove axially inward of the contact ring, the lead comprising a conductive member having a first end and a second end opposite thereto, the second end having an engagement member to engage the groove of the protector element and an arcuate surface to engage an outer surface of the contact ring of the protector element, wherein the second end of the lead has an elongated opening, the first arcuate surface is located on an inside portion of a first side of the elongated opening and the second arcuate surface located on an inside portion of a second side of the elongated opening, the second end being folded back on itself about a bend axis to create a U-shaped opening for the protector element.

8. The assembly of claim 1 wherein the first arcuate surface has a first radius and the second arcuate surface has a second radius, the first and second radius being different from one another.

9. The assembly of claim 8 wherein the first radius is smaller that the second radius.

10. The assembly of claim 1, the lead further comprising a strain relief disposed between the first and second ends.

11. The assembly of claim 10 wherein the strain relief is a U-shaped buckle.

12. A lead to attach to a protector element, the protector element having at least one circular contact ring and a groove axially inward of the contact ring, the groove having at least one substantially vertical wall, the lead comprising a conductive member having a first end and a second end opposite thereto, the second end having an engagement member to engage the the substantially vertical wall of the protector element to limit the movement of the protector element relative thereto and an arcuate surface to engage an outer surface of the contact ring of the protector element.

13. The lead of claim 12, wherein the arcuate surface is a second arcuate surface, and the engagement member comprises a first arcuate surface that is dimensioned to fit within the circular groove.

14. The lead of claim 12 wherein the second end of the lead has an elongated opening, the first arcuate surface is located on an inside portion of a first side of the elongated opening and the second arcuate surface located on an inside portion of a second side of the elongated opening, the second end being folded back on itself about a bend axis to create a U-shaped opening for the protector element.

15. The lead of claim 14 wherein a folded-over second end is created when the second end is folded back on itself and the folded-over second end defines a gap therebetween and solder is disposed within the gap.

16. The lead of claim 12 further comprising a strain relief member disposed between the first and second ends.

17. The lead of claim 16 wherein the strain relief member is a buckle.

18. A lead to attach to a generally cylindrical protector element, the protector element having at least one circular contact ring with an outer diameter greater than the protector element adjacent the contact ring, the lead comprising a conductive member having a first end and a second end opposite thereto, the second end having an engagement member to engage a substantially vertical side wall of the contact ring to limit the movement of the protector element relative thereto and an arcuate surface disposed against an outer surface of the contact ring.

19. A method of manufacturing a lead for a protector element, the protector element generally being cylindrical with a circular contact ring at at least one end that extends radially beyond an adjacent portion of the protector element, the method comprising the steps of:

forming an asymmetrical cut-out in a first end of the lead, the cut-out being asymmetrical about a bend axis, the bend axis dividing the cut-out into a first section and a second section, the first section having a first arcuate surface and the second section having a second arcuate surface, folding the lead about the bend axis, thereby making the end of the lead U-shaped to engage the protector element.

20. The method of claim 19 further comprising the step of inserting the protector element into the lead such that the first arcuate surface engages the protector element and the second arcuate surface engages the contact ring.

21. The method of claim 19 wherein the step of folding defines a gap between the first and second section.

22. The method of claim 19 further comprising the step of dispensing solder in the gap between the first and second sections.

23. The method of claim 19 further comprising the step of forming a strain relief in the lead between the protector element and a second end of the lead.

* * * * *